United States Patent
Kundaje et al.

(10) Patent No.: US 7,039,395 B2
(45) Date of Patent: May 2, 2006

(54) METHOD AND APPARATUS FOR WIRELESS AUTO-CONFERENCING

(75) Inventors: Vinay Kundaje, Succasunna, NJ (US); David Mark Leone, Flanders, NJ (US)

(73) Assignee: Cingular Wireless II, LLC, Atlanta, GA (US)

( * ) Notice: Subject to any disclaimer, the term of this patent is extended or adjusted under 35 U.S.C. 154(b) by 9 days.

(21) Appl. No.: 09/734,157

(22) Filed: Dec. 11, 2000

(65) Prior Publication Data

US 2003/0224816 A1   Dec. 4, 2003

(51) Int. Cl.
    *H04M 3/42*   (2006.01)
(52) U.S. Cl. .................. 455/417; 379/211.04
(58) Field of Classification Search ............... 455/422, 455/402, 414, 519, 515; 379/177
    See application file for complete search history.

(56) References Cited

U.S. PATENT DOCUMENTS

| | | | |
|---|---|---|---|
| 2,061,670 A | 11/1936 | Patterson | |
| 3,342,944 A | 9/1967 | Barbato et al. | |
| 3,527,889 A | 9/1970 | Nennerfelt | |
| 4,219,699 A | 8/1980 | Nilssen et al. | |
| 4,339,816 A | 7/1982 | Reed | |
| 4,706,244 A | 11/1987 | Watson et al. | |
| 4,782,517 A | 11/1988 | Bernardis et al. | |
| 4,998,243 A | 3/1991 | Kao | |
| 5,200,951 A | 4/1993 | Grau et al. | |
| 5,297,193 A | 3/1994 | Bouix et al. | |
| 5,463,617 A * | 10/1995 | Grube et al. | 370/261 |
| 5,896,565 A | 4/1999 | Miller | |
| 5,949,764 A | 9/1999 | Yoshida et al. | |
| 5,953,400 A * | 9/1999 | Rosenthal et al. | 379/202.01 |
| 6,011,909 A | 1/2000 | Newlin et al. | |
| 6,038,304 A | 3/2000 | Hart | |
| 6,044,259 A | 3/2000 | Hentila et al. | |
| 6,115,613 A * | 9/2000 | Jonsson | 455/519 |
| 6,393,275 B1 * | 5/2002 | Alfred | 455/422.1 |
| 6,600,928 B1 * | 7/2003 | Ahya et al. | 455/518 |
| 2003/0224816 A1 | 12/2003 | Kundaje et al. | |

FOREIGN PATENT DOCUMENTS

EP   82305846.6   11/1982

* cited by examiner

*Primary Examiner*—Fan Tsang
*Assistant Examiner*—Ming Chow (57) ABSTRACT

A method of managing telephone calls to members of a user group. A call initiation request is received. The request is directed to a telephone number that is associated with a user group. The members of the user group are notified that a call initiation request has been directed to the user group. A signal is received from a first member of the user group indicating acceptance of the call initiation request, and a call is connected between the first initiating party and the member. The other members of the user group are notified that the first member has accepted the call initiation request.

23 Claims, 4 Drawing Sheets

METHOD AND APPARATUS FOR WIRELESS AUTO-CONFERENCING

FIELD OF THE INVENTION

The present invention relates to the field of wireless telecommunications. In particular, the present invention relates to the field of managing calls in a wireless telephone network.

BACKGROUND

It is common for wireline telephone systems to support multiple telephone extensions that have a common access number. For example, a private residence may have telephone extensions in different rooms of the residence, and all of these extensions may have a common telephone number. When a call initiation signal is directed at that telephone number, each of the extensions may ring. Such a system has the ability to conference multiple extensions together by lifting the handsets of the extensions during a call. For example, if one of the extensions in a residence is involved in a telephone call with a party that has a second telephone number, then another extension in the residence may join the call by lifting the handset of that extension. In such a system, it is generally easy for someone in the residence to determine that a call has been directed at the residence's phone number because all of the extensions would ring. It is also easy for a person to determine that one of the extensions is in use because the person would be located in relatively close physical proximity to the extensions.

With the increasing popularity of wireless phones, many families and businesses have incorporated wireless communications into their daily activities. To satisfy consumer needs, a group of wireless phones can now be accessed via the same telephone number. In such systems, when a call initiation signal is directed to a telephone number that is associated with a group of wireless telephones, then each of the wireless phones in the group receives the call initiation signal (e.g., each phone "rings"). When one of the wireless phones accepts the call, however, the other wireless phones in the group become unusable. Similarly, if one of the wireless phones in the group initiates a call, the other phones become unusable.

While it is relatively simple to determine if someone in your household is using another extension, the situation becomes more complex when using a wireless phone. Members of a group of wireless phones are often at different locations, and it is not always possible to determine if someone is using the phone number. In addition, it may be difficult for members of a group in a wireless system to join a call that one person in the group is engaged in. While it is possible to coordinate such "conference calls" in a residence by verbally asking the other members of the household to pick up another extension, members of a wireless group may not be within verbal range.

SUMMARY OF THE INVENTION

Embodiments of the present invention provide methods and apparatus for managing telephone calls to members of a user group of wireless telephones. A request may be received to initiate a call. The request may be directed to a telephone number that is associated with a user group. The members of the user group may be signaled that the call initiation request has been received, and a first member of the user group may send a signal indicating a desire to accept the call initiation request. A call may then be connected between the first member of the user group and the party that sent the call initiation request. The other members of the user group may be signaled that the first party has accepted the call initiation request. In a further embodiment, a second member of the user group may send a request to join the call, and the second member may then be joined to the call.

In another embodiment, while the first call is still in progress, the second initiating party may direct a second call initiation request to a telephone number that is only associated with a second member of the user group, and a call may be connected between the second initiating party and the second member of the user group while the first call is still in progress. In still another embodiment, a second member of the user group may send a second call initiation request while the first call is in progress, and a call may then be connected between the second member and another party while the first call is in progress. In embodiments of the invention, signaling the members of the user group that a call initiation request has been directed to the user group includes sending the members information identifying the initiating party, and signaling the other members of the user group that the first party has accepted the first call initiation request includes sending the other members information identifying the first member.

In a further embodiment, a call management system may receive over a network a request to establish a new user group, and the call management system may update a user group database to add the new user group. In a still further embodiment, the call management system may receive over a network a request from a member of the user group to modify the attributes of the user group, and the call management system may update the user group database to modify the attributes of the user group.

DETAILED DESCRIPTION

In embodiments of the present invention, a group of wireless telephones are logically mapped together as a "user group." Each of these wireless telephones may be said to be a member of the user group. For example, the members of a user group may be associated with one another in a telephone network administration database. In one embodiment, the user group has a separate telephone number, and when a call initiation signal is directed at that number, all of the members of the user group are notified. In this embodiment, each member of the user group may also have an individual telephone number. In another embodiment, the user group may be called by calling the telephone number of any of the members.

In embodiments of the invention, when a call initiation signal is directed at the user group, all of the members are notified. For example, the telephones of the members of the user group may prompt the user to indicate the call initiation signal with a light, a tone, or a message on a text display. If a member of the user group accepts the call initiation signal (e.g., by pressing a button on their phone), a call may be connected between that member and the initiating party. In a further embodiment, a second member of the user group may join the call (e.g., by pressing a button), and a conference call may be created between the first member, the second member, and the initiating party. In a further embodiment, the database that stores the user group attributes may be accessed by a member of the user group, for example over the Internet.

Figure 1:
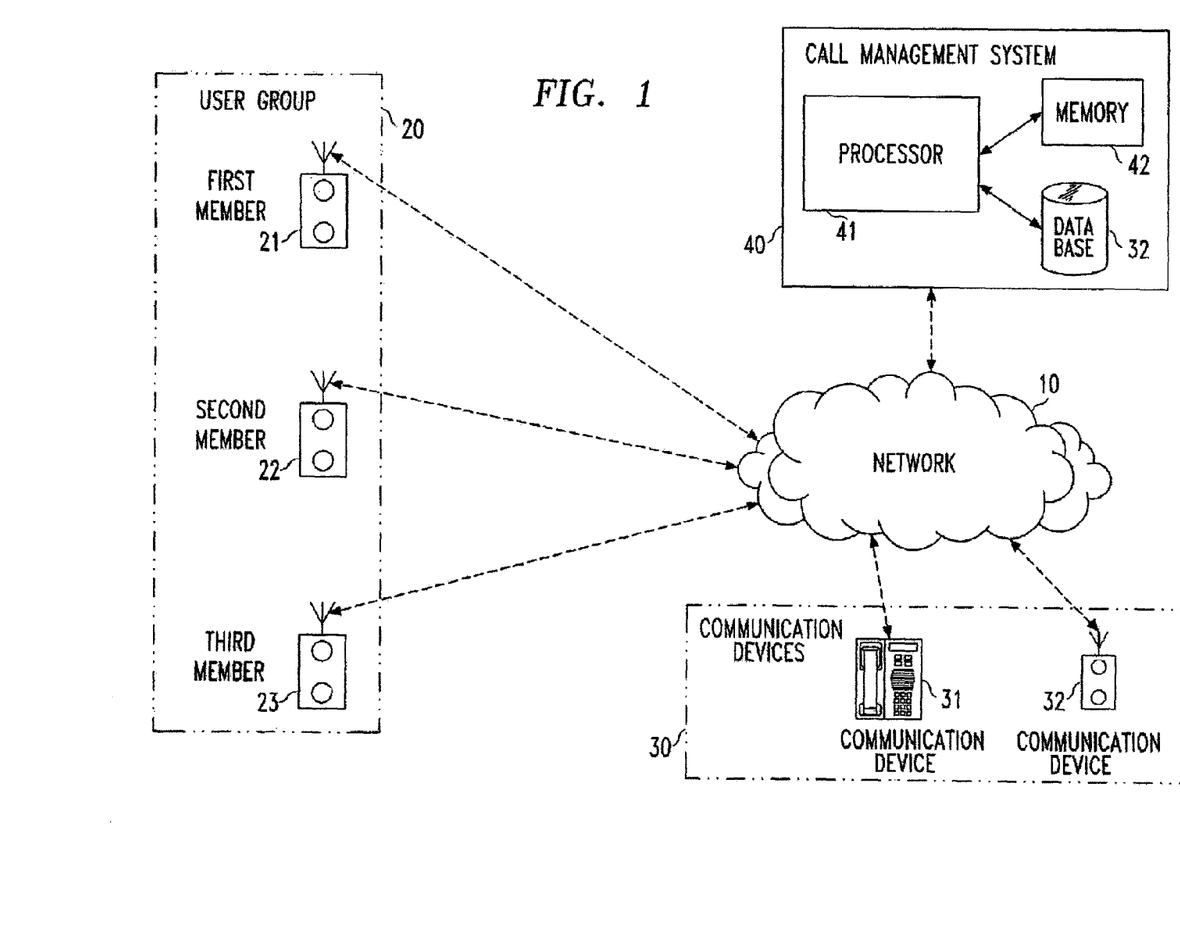
FIG. 1 is a block diagram of a telephone network in which calls to members of a user group may be managed according to an embodiment of the present invention.

FIG. 1 is a block diagram of telephone network in which calls to members of a user group may be managed according to an embodiment of the present invention. FIG. 1 shows a user group 20, communication devices 30, and a call management system 40, all of which are coupled to a network 10. The term "coupled" is intended to encompass and be broader than the term "directly connected." If A is directly connected to B, and B is directly connected to C, then A is said to be "coupled" to C. In other words, the term coupled includes the term "indirectly connected." The network 10 may be any information systems network across which the information can be sent. Examples of the network 10 include a wireline telephone network, a wireless telephone network, the Internet, an intranet, a virtual private network, or any combination of these devices.

User group 20 contains two or more wireless telephones that are logically mapped together. For example, the wireless telephones who are members of the user group may be associated with one another in a database. User group 20 is shown in FIG. 1 as including a first member 21, a second member 22, and a third member 23. In other embodiments, the user group may contain two members or may contain more than three members. User group 20 may be, for example, telephones used by a family or by a company (or a unit of the company). For example, first member 21 may be the wireless telephone that is used by a father, second unit 22 may be a wireless telephone that is used by a mother, and third unit 23 may be a wireless telephone that is used by a child.

The wireless telephones that are members of the user group (21, 22, and 23) may be, for example, a part of a cellular telephone system. The wireless telephones may be mobile units and may be located at any geographic location. That is, the members of the user group are not required to be in any geographic location relative to one another, and they would typically be located at different places. First member 21 may include, for example, a processor and one or more memories. The processor may be an Application Specific Integrated Circuit (ASIC) which has been specifically designed to perform at least some of the steps of the method in accordance with an embodiment of the present invention. ASICs are well-known in the art for applications such as digital signal processing. In another embodiment, a memory in the first member 21 contains instructions adapted to be executed by processor to perform embodiments of the present invention.

The first member 21 may also include receiving and transmitting devices. First member 21 may also include input/output devices such as a display panel, a keyboard, and a speaker. These input/output devices are capable of providing information to the user of the telephone and receiving information from the user. For example, these devices may be used to inform the user when another party is trying to initiate a call (e.g., the speaker may play a "ring"), and they may be used to indicate a desire to accept a call. These devices also may be used to display additional information, such as information about the party initiating a call. Second member 22 and third member 23 may be the same type of telephone as first member 21, or they may be different types of telephones than first member 21.

First member 21, second member 22, and third member 23 are capable of receiving and initiating calls over network 10. Such calls may be transmitted to a base station, for example, using radio frequency signals according to any known protocol (TDMA, CDMA, etc). In an embodiment, first member 21, second member 22, and third member 23 may be engaged in three separate telephone calls with other parties. Alternatively, first member 21, second member 22, and third member 23 may be engaged in the same call with another party (e.g., a conference call). In an embodiment, any subset of the members of the user group may be engaged in a conference call with a party that is not a member of the user group or with a party that is a member of the user group.

Communications devices 30 may be one or more devices that are capable of receiving and transmitting signals that represent sounds, capable of reproducing sounds based on the received signal, and capable of converting sounds into such signals. Communications devices 30 may include, for example, telephone sets that are capable of being used as an extension in a wireline telephone network. Communications devices 30 may also include telephones that are capable of being used with a cellular telephone network, in which case they may be similar to first member 21. Communications devices 30 may also include a personal computer, portable computer, or personal digital assistant that is configured for use as a telephone. FIG. 1 shows communications devices 30 as including a communication device 31 and a communication device 32, either of which may be any of the types of communications devices discussed above.

Call management system 40 may be, for example, a network server and associated peripherals that are capable of administering a telephone network. As shown in FIG. 1, Call management system 40 includes a processor 41, a memory 42, and a database 43. The processor 40 may be a general purpose microprocessor, such as one of the PENTIUM family of microprocessors manufactured by the Intel Corporation of Santa Clara, Calif., or may be an ASIC that has been specifically designed to perform at least some of the steps of the method in accordance with an embodiment of the present invention. Memory 42 may be a Random Access Memory (RAM), a hard disk, a floppy disk, an optical digital storage medium, or any other type of storage medium. Memory 42 may contain instructions that direct the call management system 40 to administer a telephone network, which may include processing requests to initiate a call to and from telephones in the network and connecting such a call. Call management system 40 may provide services such as, for example, caller ID, billing for calls, routing of calls, etc. In an embodiment, call management system 40 is used to manage a cellular telephone network.

Database 43 may contain information about the telephones in the network, which may include information about user groups in the telephone network. This information may include, for example, which telephones are members of the user groups, and the attributes of each user group. Such attributes may include identification information (preferred name, telephone #, etc.); device type (e.g., make and model of phone); ring type (e.g., tone, visual, flash, text, vibrate, combination of these); subgroup within the user group; priority (e.g., whether user can override user-group status); time of day for features to work (e.g., hours of operation); group #; device #; which devices may be blocked by this device (i.e., prevented from joining calls with this device); and whether the device is a supervisor or administrator. In another embodiment, the database may be contained in a separate memory device 42.

In an embodiment, call management system 40 is a computer network that contains multiple computers. Call management system 40 may be coupled to user group 20 and communications devices 30 over one or more networks, such as network 10. Persons who are members of a user group may be able to access a call management system directly, for example, through the Internet.

Figure 2:
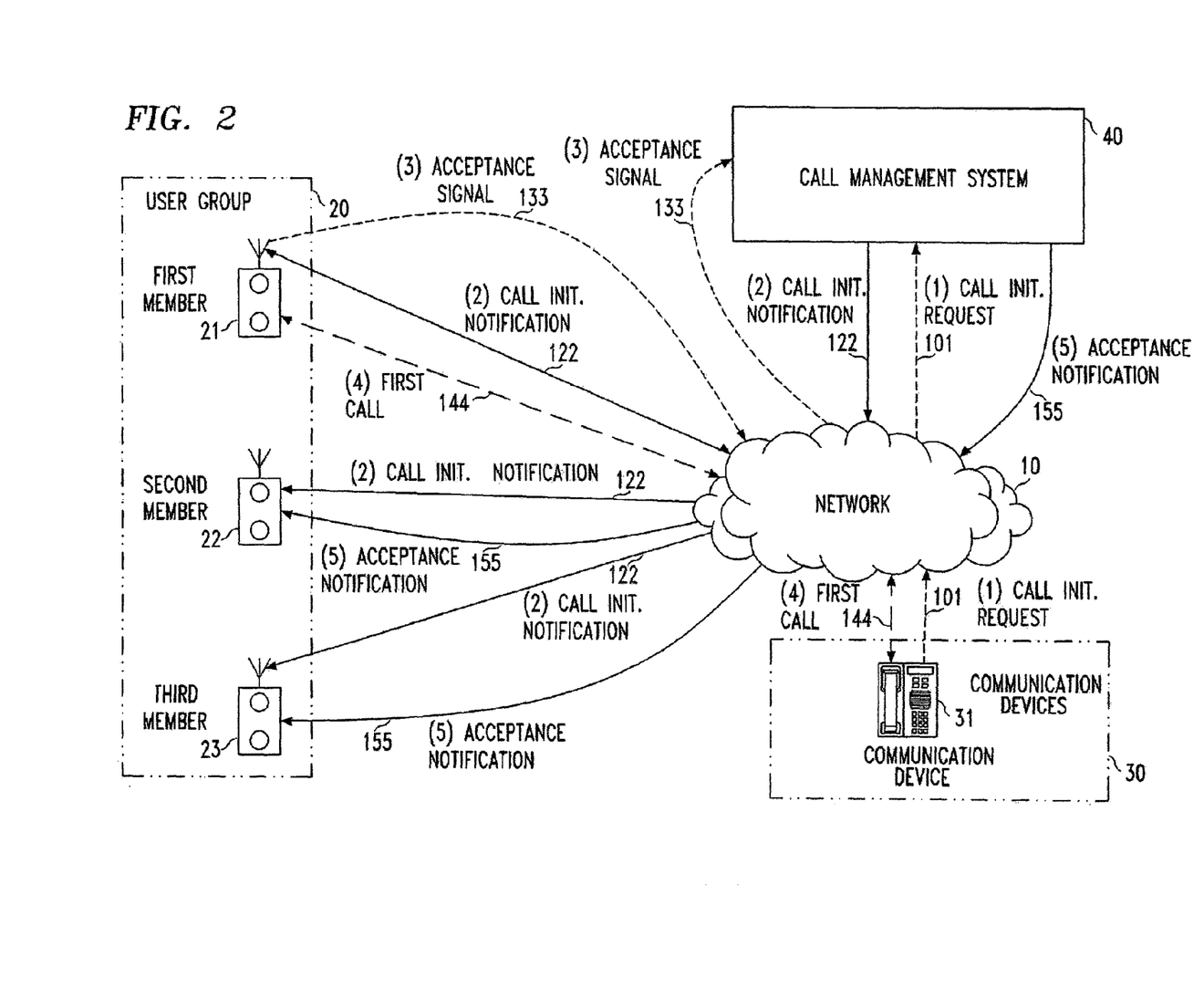
FIG. 2 is a block diagram of a telephone network that shows signals sent to manage calls according to an embodiment of the present invention.

FIG. 2 is a block diagram of a telephone network that shows signals sent to manage calls according to an embodiment of the present invention. FIG. 2 shows a telephone network that is similar to FIG. 1, including user group 20, communication devices 30, call management system 40, and network 10. As shown in FIG. 2, user group 20 includes first member 21, second member 22, and third member 23, and communication devices 30 include communication device 31. A method of managing calls to user group 20 may operate as follows. The user of communication device 31 may wish to initiate a call to a user group of wireless telephones. For example, user group 20 may be a family, and the user of communication device 31 may wish to call this family. Communication device 31 sends a call initiation request 101 that is directed to a telephone number which is associated with the user group. For example, a user of communication device 31 may dial this telephone number. This telephone number may be the telephone number of single telephone in user group 20 (i.e., the number used when calling to or from that telephone). In another embodiment, the telephone number may be a user group telephone number (i.e., one that has been set up for the user group and that is used only to initiate a call directed at the entire user group). The numbers in parenthesis ( ) in FIG. 2 signify the order that the steps are performed in this embodiment, although in other embodiments, the steps may be performed in a different order. Thus, the number (1) next to call initiation request 101 signifies that it is the first step.

According to the embodiment shown in FIG. 2, the call initiation request 101 is sent over network 10 to call management system 40. When call management system 40 receives call initiation request 101, it determines that the request is directed to user group 20 and identifies the members of user group 20. This determination may be made by referencing the number called in a database. Call management system 40 then sends a call initiation notification 122 over network 10 to the members of user group 20 to inform them that a call initiation request has been directed to the user group. When the wireless telephones in user group 20 receive this request, they may notify the user by, for example, "ringing" and/or displaying information on a screen. Call initiation request 101 and call initiation notification 122 may contain information identifying the initiating party (name and/or phone number), and the telephones in user group 20 may display this information after receiving the initiation request. The information displayed may include an indication that the initiation request was directed to the user group (as opposed to being directed only to that member).

First member 21 may decide to accept the call initiation request and may send acceptance signal 133 over network 10 to call management system 40. Upon receipt of this acceptance signal, call management system 40 may connect a first call 144 over network 10 between first member 21 and communication device 31. First call 144 may be, for example, a telephone call in which the users of first member 21 and communication device 31 can talk to one another. Call management system may also send acceptance notification 155 over network 10 to the members, other than first member 21, of user group 20. The acceptance notification 155 may include the identity of the member that accepted the call initiation request, and the wireless telephones that receive the acceptance notification may display the fact that the call has been accepted and the identify of the accepting member on a screen.

In another embodiment, instead of the communication device 31 sending a call initiation request 101, the first member 21 may send a call initiation request that is directed at communication device 31. In this embodiment, first call 144 may be set up after communication device 31 accepts the request. In other embodiments, after the call initiation request is sent, or after call 144 is set up, notification messages may be sent to the other members of the user group informing them that a call has been set up between first member 21 and communication device 31, and the other members may join first call 144.

Figure 3:
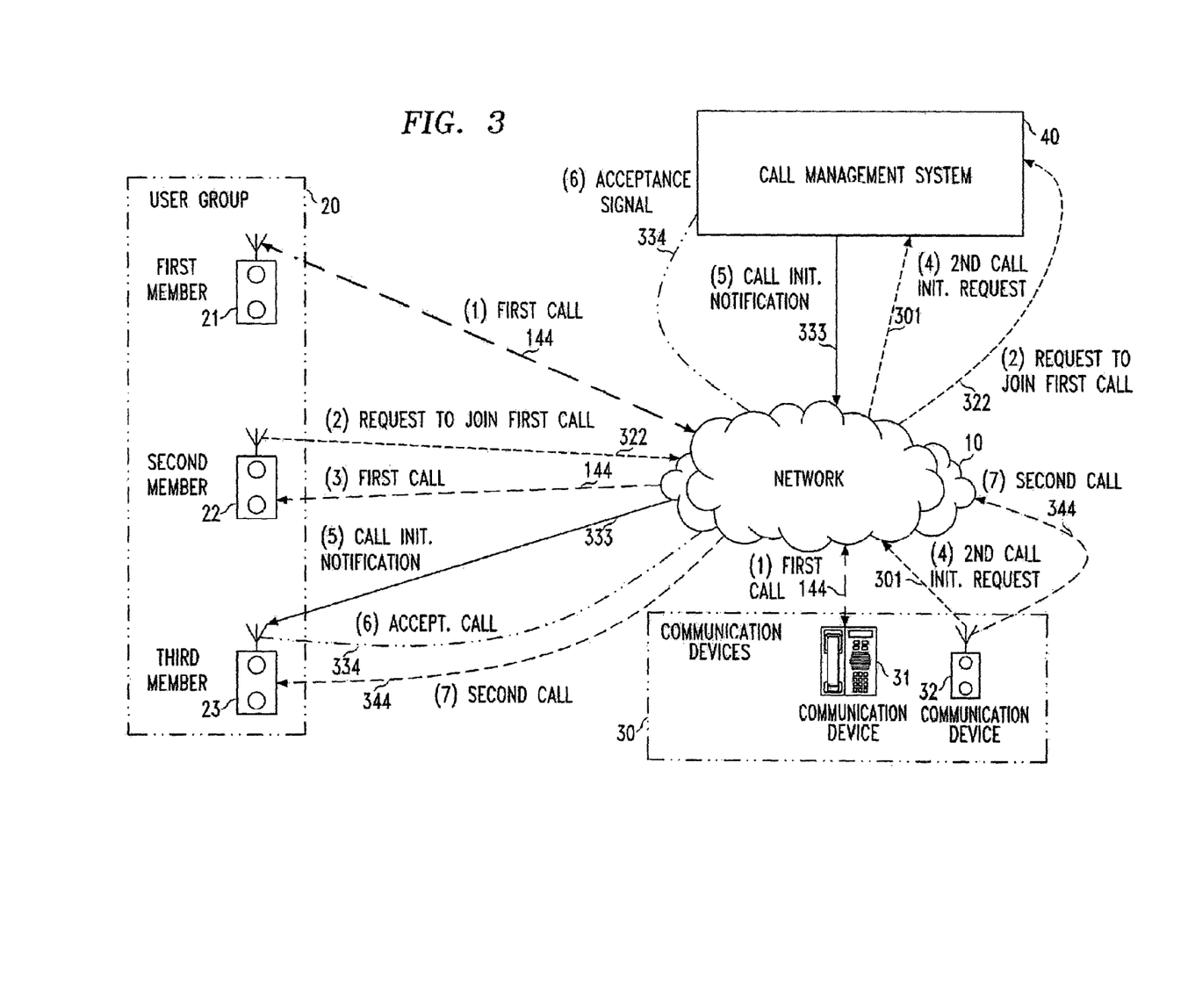
FIG. 3 is a block diagram of a telephone network that shows signals sent to manage calls according to a further embodiment of the present invention.

FIG. 3 is a block diagram of a telephone network that shows signals sent to manage calls according to a further embodiment of the present invention. FIG. 3 shows a telephone network that is similar to FIGS. 1 and 2, including user group 20, communication devices 30, call management system 40, and network 10. As shown in FIG. 3, user group 20 includes first member 21, second member 22, third member 23. Communication devices 30 includes communication device 31 and communication device 32. In the embodiment shown in FIG. 3, a first call 144 has been connected between first member 21 and communication device 32. The first call 144 may have been established, and second member 22 may have received acceptance notification 155, as discussed above. Second member 22 wishes to join first call 144 and, as shown in FIG. 3, sends a request to join call 322 through network 10 to call management system 40. Call management system 40 may then join second member 22 to first call 144 as a conference call.

For example, if first member 21 is "Tom," and user group 20 is "the Smith Family," after the first call is connected, the display of second member 22 may indicate that "Tom has accepted the call to the Smith Family, press * if you want to join this call?" Second member 22 may press the * button to indicate an intention to join the call, and second member 22's wireless telephone may send request to join first call 322 signal.

According to a further embodiment shown in FIG. 3, during the course of first call 144, a second communication device (communication device 32) may wish to initiate a call with third member 23 (as opposed to a call to any member of the user group 20). Communication device 32 sends a second call initiation request 301 over network 10 to call management system 40. Call management system 40 recognizes that the second call initiation request 301 is directed only to third member 23 (as opposed to being directed at the entire user group 20) and call management system 40 sends call initiation notification 333 over network 10 to third member 23. When third member 23 receives call initiation notification 333, it notifies the user (e.g., displays the notification on a display screen). This notification may include the identity of the initiating party, as well as the fact that the call is only being directed to the second member. The third member 23 may send acceptance signal 334 over network 10 to call management system 40 to indicate a desire to accept the call initiation request, and call management system 40 may set up a second call 344 between third member 23 and communication device 32. In this embodiment, the second call does not interfere with the first call.

Figure 4:
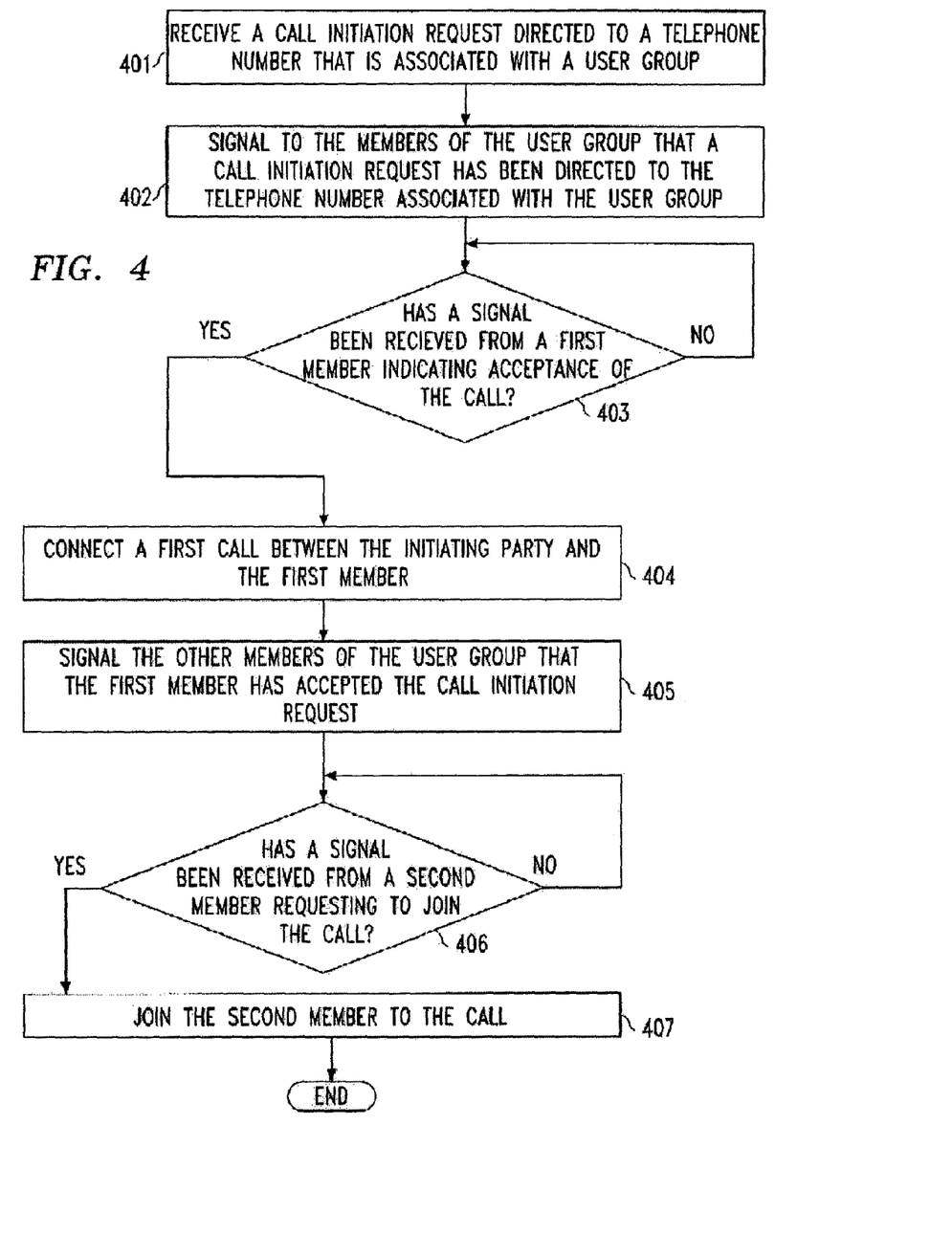
FIG. 4 is a flow diagram of a method for managing telephone calls to members of a user group according to an embodiment of the present invention.

FIG. 4 is a flow diagram of a method for managing telephone calls to members of a user group according to an embodiment of the present invention. A call management system, such as call management system 40, receives a call initiation request directed to a telephone number that is associated with a user group, such as user group 20 (401). The user group may have as members a plurality of wireless telephones. The call management system signals to the members of the user group that a call initiation request has been directed to the telephone number associated with the user group (402). The call management system then determines whether one of the members of the user group has accepted the call initiation signal (403), and the call management system waits until such an acceptance is received. The call management may perform other functions while waiting for this acceptance. When an acceptance notification has been received from a first member of the user group, the call management system connects a call between the initiating party and the first member (404). The call management system then signals the other members of the user group that the first member has accepted the first call initiation request (405). In one embodiment, the call management system then determines whether a second member of the user group wishes to join the call (406), and the call management system waits until such a request to join the call is received. When a request to join the call is received, the call management system joins the second member to the first call (e.g., as a conference call). The call management system may then send signals to the members of the user group indicating that the second member has joined the call.

In a further embodiment, the call management system may receive from the first member a request to block other members from joining the first call, and the call management system may block other members from joining the first call. In this embodiment, even if other members of the user group send a signal indicating that they wish to join the call, they will not be connected to the call. Thus, the first member may engage in a private conversation. In another embodiment, a user with supervisory privilege (who has been defined as a supervisor or administrator member of the user group) may join a call even if the call has been blocked, and the system may not send to the other members of the user group any indication that the user with supervisory privilege has joined. For example, the user with supervisory privilege may be a member of a law enforcement agency who has a warrant to tap the phones of one or more members of the user group, and this embodiment may be used to address government requirements that law enforcement be able to set up a wiretap.

In another embodiment, during the course of the call (i.e., the "first call") that was connected in the discussion above (404), the call management system receives from a second initiating party a second call initiation request directed to a telephone number that is only associated with a second member of the user group. The call management system may alert the second member of the user group that a call initiation request has been directed at the second member. Because the telephone number is only associated with a second member of the user group, the other members of the user group are not alerted to this call initiation request. According to this embodiment, the call management system may receive an indication that the second member of the user group desires to accept the second call initiation request and may connect a second call between the second initiating party and the second member. This call may take place while the first call is still in progress. In a still further embodiment, while the first call is in progress, instead of receiving a request to initiate a second call, the second member may be the party that wishes to initiate a second call. In this case, the call management system receives a second call initiation request from a second member of the user group while the first call is in progress and connects a second call between the second member of the user group and another party while the first call is in progress.

In an embodiment, when the call management system receives a call initiation request directed to a telephone number that is associated with a user group, the call management system may determine the members of the user group using a user group database. In a further embodiment, the call management system may receive a request over a network to establish a new user group. For example, this request may be sent over the Internet by a member of the Smith Family. Such a request may include the names and telephone numbers of the members of the user group (e.g., the names and telephone numbers of the members of the Smith family). When such a request is received, the call management system may update the user group database to add the new user group. In a further embodiment, the call management system may receive a request over a network from a member of the user group to modify the attributes of the user group, and the call management system may update the user group database to modify the attributes of the user group.

In the embodiments described above, two or more wireless phones may be accessed via the same number. When one of the phones is in use, the other phone indicates that that first phone is in use. The second phone can then join the call, and a conference call may be created. Several embodiments of the present invention are specifically illustrated and/or described herein. However, it will be appreciated that modifications and variations of the present invention are covered by the above teachings and within the purview of the appended claims without departing from the spirit and intended scope of the invention. For example, while in the embodiments shown the party initiating the call with the user group is not a member of the user group, in other embodiments the initiating party may be a member of the user group.

What is claimed is:

1. A method of managing telephone calls to members of a user group, the method comprising:

receiving from a first initiating party a first call initiation request directed to a first telephone number that is associated with a user group, the user group having as members a plurality of wireless telephones;

signaling to the members of the user group that the first call initiation request has been directed to the first telephone number;

receiving a signal from a first member of the user group indicating acceptance of the first call initiation request;

connecting a first call between the first initiating party and the first member; and signaling to the other members of the user group that the first member has accepted the first call initiation request without first requiring that a signal be received from another member of the user group either that requests a call initiation or that indicates acceptance of the first call initiation request.

2. The method of claim 1, wherein the method further comprises:

receiving a request from a second member of the user group to join the first call; and joining the second member to the first call.

3. The method of claim 1, wherein the method further comprises:
receiving from the first member a request to block other members from joining the first call; and
blocking other members from joining the first call.

4. The method of claim 1, wherein the method further comprises:
receiving from a second initiating party a second call initiation request directed to a second telephone number that is only associated with a second member of the user group;
alerting the second member of the user group that a call initiation request has been directed at the second member;
receiving an indication that the second member of the user group desires to accept the second call initiation request; and
connecting a second call between the second initiating party and the second member.

5. The method of claim 1, wherein the method farther comprises:
receiving a second call initiation request from a second member of the user group while the first call is in progress; and
connecting a second call between the second member of the user group and another party while the first call is in progress.

6. The method of claim 1, wherein signaling the members of the user group that a call initiation request has been directed to the user group includes sending the members information identifying the initiating party, and wherein signaling the other members of the user group that the first party has accepted the first call initiation request includes sending the other members information identifying the first member.

7. The method of claim 1, wherein the first initiating party is not a member of the user group.

8. The method of claim 1, wherein the other members of the user group are not sent a signal indicating that the first member has accepted the first call initiation request if the first member has supervisory authority.

9. A system for managing telephone calls to members of a user group, the system comprising:
a processor,
a computer-readable medium having stored thereon instructions adapted to be executed by the processor, the instructions which, when executed, cause the processor to:
receive from a first initiating party a first call initiation request directed to a first telephone number that is associated with a user group, the user group having as members a plurality of wireless telephones;
determine the members of the user group using a user group database;
signal to the members of the user group that a call initiation request has been directed to the first telephone number;
receive a signal from a first member of the user group indicating a desire to accept the first call initiation request;
connect a first call between the first initiating party and the first member; and
signal the other members of the user group that the first member has accepted the first call initiation request without first requiring that a signal be received from another member of the user group either that requests a call initiation or that indicates a desire to accept the first call initiation request.

10. The system of claim 9, wherein the instructions further include instructions to:
receive a request from a second member of the user group to join the first call; and
join the second member to the first call as a conference call.

11. The system of claim 9, wherein the instructions further include instructions to:
receive from the first member a request to block other members from joining the first call; and
block other members from joining the first call.

12. The system of claim 9, wherein the instructions further include instructions to:
receive from a second initiating party a second call initiation request directed to a second telephone number that is only associated with a second member of the user group;
alert the second member of the user group that a call initiation request has been directed at the second member;
receive an indication that the second member of the user group desires to accept the second call initiation request; and
connect a second call between the second initiating party and the second member.

13. The system of claim 9, wherein the instructions further include instructions to:
receive a second call initiation request from a second member of the user group while the first call is in progress; and
connect a second call between the second member of the user group and another party while the first call is in progress.

14. The system of claim 9, wherein the instructions to signal the members of the user group that a call initiation request has been directed to the user group includes instructions to send the members information identifying the initiating party, and wherein the instructions to signal the other members of the user group that the first party has accepted the first call initiation request includes instructions to send the other members information identifying the first member.

15. The system of claim 9, wherein the first initiating party is not a member of the user group.

16. The system of claim 9, wherein the instructions further include instructions to:
receive a request over a network to establish a new user group; and
update the user group database to add the new user group.

17. The system of claim 9, wherein the instructions further include instructions to:
receive a request over a network from a member of the user group to modify attributes of the user group; and
update the user group database to modify the attributes of the user group.

18. A method of managing a telephone call directed to a user group, the method comprising:
receiving at a first wireless telephone a first signal indicating that a call initiation request has been directed by an initiating party to a first telephone number that is associated with a user group, the user group having as members a plurality of wireless telephones, the first wireless telephone being a member of the user group;

receiving a second signal at the first wireless telephone indicating that a second member of the user group has accepted the call initiation request;

receiving a third signal at the first wireless telephone indicating that a call has been connected between the initiating party and the second member; and sending a signal from the first wireless telephone requesting to join the call.

19. The method of claim 18, wherein receiving the first signal, second signal, and third signal each further include outputting an indication that the respective signal was received on an output device on the first wireless telephone.

20. The method of claim 18, wherein the method further comprises:

receiving a signal indicating that the first wireless telephone is to block other members from joining the call.

21. A wireless telephone, the wireless telephone comprising:

a processor; and a computer-readable medium having stored thereon instructions adapted to be executed by the processor, the instructions which, when executed, cause the processor to:

receive a first input indicating that a call initiation request has been directed by an initiating party to a first telephone number that is associated with a user group, the user group having as members a plurality of wireless telephones, the wireless telephone being a member of the user group;

receive a second input indicating that a second member of the user group has accepted the call initiation request;

receive a third input indicating that a call has been connected between the initiating party and the second member; and send a signal from the wireless telephone requesting to join the call.

22. The wireless telephone of claim 21, wherein the instructions further include instructions to:

cause an output on an output device on the wireless telephone indicating that the first input, second input, and third input were received by the wireless telephone.

23. The wireless telephone of claim 21, wherein the instructions further include instructions to:

receive an input indicating that the wireless telephone is to block other members from joining the call.

* * * * *